(12) United States Patent
Mundra et al.

(10) Patent No.: US 9,056,965 B2
(45) Date of Patent: Jun. 16, 2015

(54) PROCESS FOR MIXING POLYVINYL CHLORIDE WITH A BIO-BASED PLASTICIZER

(75) Inventors: Manish Mundra, Somerset, NJ (US); Neil W. Dunchus, Kinnelon, NJ (US); Anthony C. Neubauer, Piscataway, NJ (US); Caroline H. Laufer, Millington, NJ (US); Michael B. Biscoglio, Blue Bell, PA (US); Robert F. Eaton, Belle Mead, NJ (US); Abhijit Ghosh-Dastidar, East Brunswick, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/342,830

(22) PCT Filed: Sep. 14, 2012

(86) PCT No.: PCT/US2012/055324
§ 371 (c)(1),
(2), (4) Date: Mar. 5, 2014

(87) PCT Pub. No.: WO2013/048775
PCT Pub. Date: Apr. 4, 2013

(65) Prior Publication Data
US 2014/0235769 A1    Aug. 21, 2014

Related U.S. Application Data

(60) Provisional application No. 61/541,223, filed on Sep. 30, 2011.

(51) Int. Cl.
| | | |
|---|---|---|
| *C08L 27/06* | (2006.01) | |
| *C08K 5/1515* | (2006.01) | |
| *C08J 3/20* | (2006.01) | |
| *C08K 5/00* | (2006.01) | |
| *B29C 47/38* | (2006.01) | |
| *B29C 47/60* | (2006.01) | |
| *C08K 3/26* | (2006.01) | |

(52) U.S. Cl.
CPC ............ *C08K 5/1515* (2013.01); *C08J 3/203* (2013.01); *C08L 27/06* (2013.01); *C08J 2327/06* (2013.01); *C08K 3/26* (2013.01); *C08K 2201/014* (2013.01); *C08K 5/0016* (2013.01); *B29C 47/385* (2013.01); *B29C 47/6087* (2013.01)

(58) Field of Classification Search
CPC ........................................................ C08L 27/06
USPC .................. 524/569, 567, 312, 311, 313, 107
IPC .................... C08L 27/06, 27/04; C08K 5/0016, C08K 5/103, 5/101
See application file for complete search history.

(56) References Cited

U.S. PATENT DOCUMENTS

| | | | | |
|---|---|---|---|---|
| 3,090,763 | A * | 5/1963 | Hillier ........................... | 524/569 |
| 3,377,304 | A * | 4/1968 | Kuester et al. ................ | 524/114 |
| 3,479,308 | A * | 11/1969 | Amato et al. .................. | 524/110 |
| 4,104,232 | A * | 8/1978 | Inagaki et al. ................ | 524/311 |
| 4,137,216 | A | 1/1979 | Lemper et al. | |
| 4,144,202 | A | 3/1979 | Ashcraft et al. | |
| 4,237,239 | A | 12/1980 | Lilley | |
| 4,976,890 | A * | 12/1990 | Felter et al. ................... | 252/511 |
| 5,066,422 | A | 11/1991 | Felter et al. | |
| 5,233,022 | A * | 8/1993 | Donatti et al. ................ | 528/503 |
| 5,246,783 | A | 9/1993 | Spenadel et al. | |
| 5,502,123 | A * | 3/1996 | Hiyama et al. ................. | 526/88 |
| 5,643,590 | A * | 7/1997 | Cannelongo .................. | 424/406 |
| 6,063,846 | A * | 5/2000 | Weng et al. .................... | 524/296 |
| 6,127,326 | A * | 10/2000 | Dieckmann et al. .......... | 508/491 |
| 6,608,142 | B1 | 8/2003 | Weng et al. | |
| 6,797,753 | B2 * | 9/2004 | Benecke et al. ............... | 524/114 |
| 7,534,280 | B2 | 5/2009 | Funk | |
| 8,552,098 | B2 * | 10/2013 | Chaudhary et al. ........... | 524/318 |
| 8,697,787 | B2 * | 4/2014 | Chaudhary .................... | 524/114 |
| 8,771,815 | B2 * | 7/2014 | Dakka et al. .................. | 428/35.7 |
| 8,859,654 | B2 * | 10/2014 | Chaudhary et al. ........... | 524/114 |
| 2003/0171458 | A1 * | 9/2003 | Buchanan et al. .............. | 524/32 |
| 2005/0203230 | A1 | 9/2005 | Kadakia et al. | |
| 2006/0236734 | A1 | 10/2006 | Funk | |
| 2010/0010127 | A1 * | 1/2010 | Barki et al. .................... | 524/114 |
| 2011/0076502 | A1 * | 3/2011 | Chaudhary et al. ........... | 428/418 |
| 2012/0181056 | A1 * | 7/2012 | Chaudhary et al. ..... | 174/110 SR |
| 2012/0181061 | A1 | 7/2012 | Chaudhary et al. | |
| 2013/0206450 | A1 * | 8/2013 | Eaton et al. ............. | 174/110 SR |
| 2014/0234622 | A1 * | 8/2014 | Mundra et al. ................ | 428/394 |

FOREIGN PATENT DOCUMENTS

| | | | | |
|---|---|---|---|---|
| CN | 102504444 A * | 6/2012 | ............ | C08K 13/02 |
| EP | 0659777 A1 | 6/1995 | | |
| JP | 49-41460 * | 4/1974 | | |
| JP | 49-41461 * | 4/1974 | | |
| WO | WO 2009/102877 A1 * | 8/2009 | ............... | C08K 5/00 |
| WO | 2011/041380 A1 | 4/2011 | | |
| WO | WO 2011/041396 A1 * | 4/2011 | ............... | C08K 5/00 |

* cited by examiner

Primary Examiner — Rip A Lee
(74) Attorney, Agent, or Firm — Whyte Hirschboeck Dudek S.C.

(57) ABSTRACT

Processes for making a polyvinyl chloride (PVC) dry blend composition with a phthalate-free, bio-based plasticizer and filler, having a bulk density of greater than 0.67 g/cc and an extrusion rate of greater than 65 gm/minute for a single screw extruder of 0.75 in barrel diameter with a 25:1 L:D general purpose polyethylene screw at 75 rotations per minute screw speed, and compositions made by the processes are provided.

12 Claims, 2 Drawing Sheets

PROCESS FOR MIXING POLYVINYL CHLORIDE WITH A BIO-BASED PLASTICIZER

CROSS REFERENCE TO RELATED APPLICATION

The present application is the national phase of PCT Patent Application No. PCT/US2012/055324 filed Sep. 14, 2012, which claims priority to U.S. Provisional Application No. 61/541,223, filed Sep. 30, 2011, the entire content of which is incorporated by reference herein.

FIELD

This invention relates to blends of polyvinyl chloride (PVC) and a plasticizer derived from a biological source, and processes of making the PVC and bio-based plasticizer blends.

BACKGROUND OF THE INVENTION

PVC compositions are well known in the art (see, for example, U.S. Pat. No. 6,063,846, U.S. Pat. No. 6,608,142 and U.S. patent publication 2005/0203230). PVC compositions that do not contain a plasticizer tend to be rigid and are suitable for the manufacture of rigid products such as pipe and tubing. PVC compositions that include a plasticizer tend to be flexible and are suitable for use in such applications as wire and cable insulation and jacketing, and medical device components. Examples of PVC compositions containing a plasticizer include the FLEXALLOY® products available from Teknor Apex.

Plasticizers are compounds or mixtures of compounds that are added to polymer resins to impart softness and flexibility. Phthalic acid diesters (also known as "phthalates") are well-known petroleum-derived plasticizers that are widely used in many flexible polymer products, such as polymer products formed from PVC and other polar polymers. Known petroleum-derived plasticizers also include trimellitates and adipic polyesters, both typically used in high temperature applications. Mixtures of plasticizers are often used to obtain optimum properties.

Petroleum-derived plasticizers, particularly the phthalate plasticizers, however, have come under intense scrutiny by public interest groups that are concerned about their negative environmental impact and potential adverse health effects in humans (especially children). As such, plasticizers derived from other sources have become of great interest, particularly those derived from biological sources such as seeds and nuts. Exemplary biological sources include, but are not limited to, oils derived from soy bean, linseed, tung seed, coconut, palm, olive, cotton seed, oiticica seed and castor bean. Plasticizers derived from biological sources are generally phthalate free. Bio-based plasticizers are advantageous because they help reduce greenhouse gas emissions, and enable the user to obtain carbon and/or LEED (Leadership in Energy and Environmental Design) credits. However, if conventional processes for producing a PVC dry blend use a bio-based plasticizer, it results in an overly dry powder blend having a low bulk density, e.g. <0.60 g/cc, with very poor output feed rates to a subsequent extruder or other processing apparatus, for example, an output rate in the range of 10-50 gm/minute for a single screw extruder of 0.75-inch (19 mm) barrel diameter with a 25:1 L:D general purpose polyethylene screw at 75 rotations per minute screw speed. If a conventional dry blending process for producing a PVC dry blend use a conventional phthalate plasticizer, it results in a dry powder blend having a high bulk density, e.g. >0.7 g/cc, with very good output feed rates to a subsequent extruder or other processing apparatus, for example, an output rate in the range of 65-75 gm/minute for a single screw extruder of 0.75-inch (19 mm) barrel diameter with a 25:1 L:D general purpose polyethylene screw at 75 rotations per minute screw speed. Consequently, a need exists for a process for producing dry blends of PVC and bio-based, phthalate-free plasticizers having the same, or substantially the same, chemical and/or physical properties as dry blends made from PVC and phthalate plasticizers.

SUMMARY OF THE INVENTION

In embodiments of the invention, a process is provided for producing a PVC dry blend composition having a bulk density of greater than 0.67 g/cc, which comprises PVC, a phthalate-free, bio-based plasticizer and a filler. In one embodiment, the process comprises mixing the PVC, bio-based plasticizer and filler at a temperature ranging from 25° C. to 70° C. for an effective time period to form the PVC dry blend composition. In another embodiment, the process comprises mixing PVC with the bio-based plasticizer at 25° C. to 70° C. for a set hold time before combining the filler to produce the dry blend PVC composition. In embodiments of the process, mixing of the PVC, the bio-based plasticizer and filler is conducted until the bulk density and a drop temperature of 55° C. to 65° C. are reached. In some embodiments, the PVC dry blend composition has an extrusion rate of greater than 65 gm/minute. In embodiments, the PVC dry blend composition has a density in the range of 0.67-0.76 g/cc and an output rate in the range of 68-76 gm/minute for a single screw extruder of 0.75-inch (19 mm) barrel diameter with a 25:1 L:D general purpose polyethylene screw at 75 rotations per minute screw speed.

In one embodiment, the invention is a process for producing a polyvinyl chloride (PVC) dry blend composition, the process comprising mixing PVC, a phthalate-free bio-based plasticizer, and a filler at a temperature between 25° C. and 70° C. and a time effective to form a dry mixture comprising aggregated PVC particles and a bulk density of greater than 0.67 g/cc. In one embodiment, the invention is a composition prepared by the process. In another embodiment, the invention is an article prepared from the composition.

In embodiments, the composition comprises a dry mixture of aggregated PVC particles, which have an average particle size of 0.1 to 10 mm. In some embodiments, particles of the filler are agglomerated on the surface of the aggregated PVC particles.

In embodiments, the PVC dry blend composition comprises:

A. 20 to 80 wt % PVC;
B. 10 to 40 wt % bio-based plasticizer; and
C. 5 to 40 wt % filler.

The PVC dry blend composition may also include one or more conventional additives such as heat stabilizers, fire retardant fillers, UV stabilizers, slip agents, process aids, etc. When used, the sum of all conventional additives can be in an amount of >0 wt % up to 40 wt %, based on the total weight of the PVC dry blend composition.

In preferred embodiments, the bio-based plasticizer comprises a blend of an epoxidized oil (i.e., epoxidized triglyceride liquid) and epoxidized fatty acid $C_1$-$C_{14}$ ester, preferable a $C_1$-$C_{10}$ epoxidized fatty acid, more preferably a $C_1$-$C_8$ epoxidized fatty acid, most preferable a $C_1$ epoxidized fatty acid. In a further preferred embodiment, the bio-based plasticizer comprises a blend of epoxidized soybean oil (ESO)

and epoxidized methyl ester of soybean oil (soy-eFAME), preferably a 75:25 to 25:75 (w/w) blend of ESO and soy-eFAME. In another preferred embodiment, the bio-based plasticizer comprises a 65:35 to 50:50 (w/w) blend of ESO and soy-eFAME.

The invention further provides articles such as a wire or cable jacket or sheath fabricated from the PVC dry blend composition.

The use of bio-based plasticizers is advantageous because, relative to more conventional petrochemical-based plasticizers, such as phthalates or trimetallitates, bio-based plasticizers are environmentally friendly and derived from renewable resources. The present process overcomes various problems that have prevented various bio-based plasticizers from being used in PVC resin-based compositions. The PVC dry blend compositions prepared according to the process of the invention provide improved output feed rates as compared to the output feed rates of a PVC dry blend prepared by conventional phthalate processing (using a drop temperature >65° C., or more preferably >75° C. and most preferably >85° C.), which is due, at least in part, to the bulk density level and morphology of the PVC particles of the composition that results from the process of the invention.

DETAILED DESCRIPTION OF THE PREFERRED EMBODIMENT

Definitions

Figure 1A:
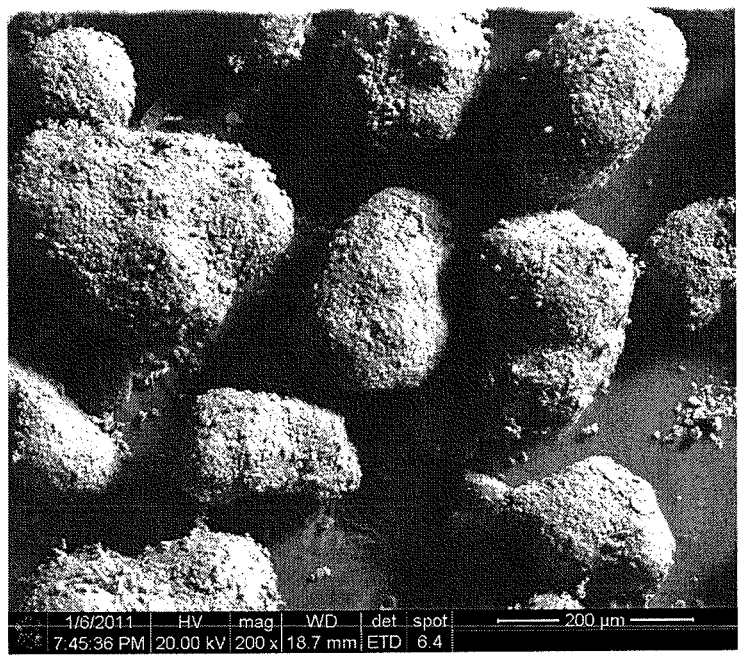
FIGS. 1A-1B are Scanning Electron Microscope (SEM) micrograph images (200 micron scale) of PVC particles of dry blends of the Comparative Examples utilizing a conventional phthalate plasticizer (DIDP) and the Inventive Examples utilizing a bio-based plasticizer (LPLS), respectively, from Example 1.

Unless stated to the contrary, implicit from the context, or customary in the art, all parts and percents are based on weight.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of bio-based plasticizer and PVC in the dry blends.

"Composition" and like terms mean a mixture or blend of two or more components.

"Plasticizer" and like terms mean a substance that lowers at least one of the modulus and tensile strength, and increases at least one of flexibility, elongation, impact strength, and tear-strength of a PVC resin to which it is added. A plasticizer may also lower the melting point of a PVC resin, lower the glass transition temperature ($T_g$) and/or enhance processability of the PVC resin to which it is added.

"Bio-based plasticizer" and like terms mean a biochemical plasticizer derived from a biological source, such as plant, animal, bacteria, yeast, algae, etc. A bio-based plasticizer can comprise a single biochemical plasticizer or a blend of two or more biochemical plasticizers. U.S. 2010/0010127 describes biochemical plasticizers and methods of their production.

"Bulk density" is defined as the weight per unit volume of material and is primarily used for powders or pellets. Bulk density is measured in units of g/cc according to ASTM D1895 B.

The term "epoxidized fatty acid ester," as used herein, is a compound with at least one fatty acid moiety which contains at least one epoxide group.

An "epoxide group" is a three-membered cyclic ether (also called oxirane or an alkylene oxide) in which an oxygen atom is joined to each of two carbon atoms that are already bonded to each other.

The term "output feed rate," as used herein, is the feed rate in gm/minute of a single screw extruder of 0.75-inch (19-mm) barrel diameter with a 25:1 L:D general purpose polyethylene screw at 75 rotations per minute screw speed, which is measured by collecting and weighing extruder output for a specific increment of time (3 minutes) and is reported as grams per minute.

Bio-Based Plasticizers

The bio-based plasticizer comprises one or more epoxidized biochemical plasticizers. For the purposes of this disclosure, a plasticizer is epoxidized if it contains at least one epoxide group. Nonlimiting examples of suitable epoxidized biochemical plasticizers include naturally occurring epoxidized oils such as Vernonia oil, etc.; epoxidized fatty acid esters of plant and animal oils such as epoxidized soybean oil (ESO), epoxidized corn oil, epoxidized sunflower oil, epoxidized palm oil, epoxidized linseed oil, epoxidized canola oil, epoxidized rapeseed oil, epoxidized safflower oil, epoxidized tung oil, epoxidized tall oil, epoxidized castor oil, epoxidized fish oil, epoxidized beef tallow oil, epoxidized algae oil, etc.; epoxidized fatty acid $C_1$-$C_{14}$ esters of plant, algae, and animal oils including, for example, methyl, ethyl, propyl, butyl and 2-ethylhexyl esters, such as epoxidized methyl ester of soybean oil (soy-eFAME), etc.; epoxidized fatty acid derivatives such as epoxidized propylene glycol dioleate, epoxidized methyl stearate, epoxidized butyl stearate, epoxidized 2-ethylhexyl stearate, epoxidized stearyl stearate, 3,4-epoxycyclohexylmethyl-3,4-epoxycyclohexane carboxylate epoxidized soybean oil, polyethylene glycol diepoxy soyate, etc.; and any combination of the foregoing. Preferred biochemical plasticizers include ESO and soy-eFAME (epoxidized methyl soyate).

In a preferred embodiment, the bio-based plasticizer comprises a blend of one or more epoxidized fatty acid esters (e.g., ESO) and one or more epoxidized fatty acid $C_1$-$C_{14}$ esters (e.g., soy-eFAME). A preferred blend of biochemical plasticizers comprises soy-eFAME and ESO in a w/w ratio of 75:25 to 25:75, preferably 35:65 to 50:50. Soy-eFAME is generally composed of 10-15 wt % saturated fatty acids (palmitic and stearic acids) and 85-90 wt % unsaturated fatty acids (oleic acid, linoleic acid, linolenic acid). A non-limiting example of a suitable plasticizer blend is ECOLIBRIUM LPLAS bio-based plasticizer (The Dow Chemical Company), which is composed of a blend of soy-eFAME and ESO.

Polyvinyl Chloride Resins

The polyvinyl chloride resin (also referred to as a vinyl chloride polymer) component of the dry blend PVC composition is a solid, high molecular weight polymer that may be a polyvinyl chloride homopolymer or a copolymer of vinyl chloride having copolymerized units of one or more additional comonomers. Graft copolymers of vinyl chloride are also suitable for use in the dry blend PVC composition. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component in the dry blend PVC composition.

Filler

The dry blend PVC composition includes one or more fillers. Examples of suitable fillers include silica, clay, titanium dioxide, talc, calcium carbonate, calcined kaolin (clay) and other mineral fillers. The fillers can be coated or uncoated. Optionally, the filler can be subjected to a drying process to reduce the water content. The filler should be included in the composition in an amount within a range from >0 to 40, preferably 5 to 40 wt %, preferably 5 to 30 wt %, based on the weight of the dry blend composition.

Additives

The PVC dry blend composition can optionally contain additives such as antioxidants (e.g., hindered phenolics (such as Irganox® 1010 or Irganox® 1076), free-radical scavengers, phosphites (e.g., Irgafos® 168 all trademarks of Ciba Geigy), pigments ($TiO_2$ particles), heat stabilizers, light stabilizers, blowing agents, lubricants, pigments, colorants, processing aids, crosslinking agents, flame-retardants, anti-drip agents, curing agents, boosters and retardants, coupling agents, antistatic agents, nucleating agents, slip agents, viscosity control agents, tackifiers, anti-blocking agents, surfactants, extender oils, acid scavengers, metal deactivators, and the like. The use of such additives permits the compositions to be tailored for use in various applications. If additives are present, they typically account for no greater than 15 wt %, based on the total weight of the dry blend composition.

Examples of inorganic, non-halogenated flame retardant fillers include metal hydrates such as aluminum hydrate and magnesium hydrate, metal hydroxides such as magnesium hydroxide ($Mg(OH)_2$) and aluminum trihydroxide (ATH) (e.g., Apyral 40CD (Nabeltec)), metal oxides such as titanium dioxide, silica, alumina, huntite, antimony trioxide, potassium oxide, zirconium oxide, zinc oxide and magnesium oxide, carbon black, carbon fibers, expanded graphite, talc, clay, organo-modified clay, calcium carbonate, red phosphorous, wollastonite, mica, ammonium octamolybdate, frits, hollow glass microspheres, glass fibers, expanded graphite, and the like. In some embodiments, the dry blend PVC composition preferably includes a heat stabilizer. Nonlimiting examples of suitable heat stabilizers include lead-free mixed metal heat stabilizers, lead stabilizers, organic heat stabilizers, epoxides, salts of monocarboxylic acids, phenolic antioxidants, organic phosphites, hydrotalcites, zeolites, perchlorates and/or betadiketones. Nonlimiting examples of suitable betadiketones are dibenzoylmethane, palmitoyl benzoyl methane, stearoyl benzoyl methane and mixtures thereof. A nonlimiting example of suitable dibenzoylmethane is Rhodiastab® 83. A nonlimiting example of suitable mixtures of palmitoyl benzoyl methane and stearoyl benzoyl methane is Rhodiastab® 50. Nonlimiting examples of suitable lead-free mixed metal heat stabilizers include Mark® 6797, Mark® 6776 ACM, Mark® 6777 ACM, Therm-Chek® RC215P, Therm-Chek® 7208, Naftosafe® EH-314, Baeropan® MC 90400 KA, Baeropan® MC 90400 KA/1, Baeropan® MC8553 KA-ST 3-US, Baeropan® MC 9238 KA-US, Baeropan® MC 90249 KA, and Baeropan® MC 9754 KA. Heat stabilizers can be used in amounts of 0 to 40, preferably 0-5, preferably 1-3, wt % based on the weight of the dry blend composition.

Relative Amounts of PVC, Plasticizer and Filler

The PVC is blended with the plasticizer and filler to achieve a desired dry blend consistency. The relative amounts of the PVC, plasticizer and filler can vary, but preferably, the PVC component is 20 to 80, preferably 25 to 75, preferably 30 to 60, the bio-based plasticizer is 10 to 40, preferably 15 to 35, preferably 15 to 30, and the filler is >0 to 40, preferably 5 to 40, preferably 5 to 30, wt % based on the total weight of the dry blend composition. In some embodiments, the dry blend composition further comprises a heat stabilizer at 0 to 5, preferably 1 to 3, and/or a flame retardant at 0 to 20, preferably 0 to 10, wt % based on the total weight of the dry blend composition.

Preparation of Dry Blend Composition

In embodiments, the PVC dry blend composition is made by absorption of the bio-based plasticizer in the PVC powder and the adherence of the filler particles to the surface of the PVC particles.

The dry blend composition can be made using high, medium or low intensity solid blenders such as a Henschel or Papenmeyer or similar (high intensity) blenders, or Lodige plow blade blender or similar (medium intensity) blenders, or a Brabender® mixer, a ribbon blender or similar (low intensity) blenders. In a first step, PVC powder is mixed while heating to a stock temperature which is at or below the melting point of the neat PVC resin, preferably ranging from 25° C. up to 70° C. Heating of the PVC powder can be through use of a heated jacket of the mixer and/or by frictional heat that is generated during the mixing process. In preferred embodiments, the PVC powder is combined with a heat stabilizer, preferably in a ratio amount (w/w) of 97-99:3-1.

After the PVC stock temperature is reached, the bio-based plasticizer is added to the PVC component with agitation. In some embodiments, mixing of the PVC stock and plasticizer is conducted for a minimum residence time ("hold time") before the filler component and optional additives are combined with the PVC/plasticizer mixture. In some embodiments, the hold time before adding the filler is from 0.5 to 5.0 minutes, preferably 1 to 3 minutes, in order to allow absorption of the plasticizer in the PVC powder such that a consistency of the material is aggregated particles. Preferably, the aggregated PVC particles have an average particle size ranging from 0.1 to 10 mm, preferably 0.1 to 5 mm, with the preponderance of the particles having an average particle size of 1 to 5 mm, preferably 3 to 5 mm. Although not preferred, in some embodiments, the filler can be added together with the plasticizer to the PVC stock.

Process times and temperatures of the PVC and plasticizer, and the order of addition of the filler (and optional heat stabilizer and other additives) can be adjusted, for example, according to the diffusion characteristic of the plasticizer into the PVC particles, coupled with the solubility of the plasticizer liquid at a given temperature, such that there is sufficient surface tension from partially dried PVC granules to enable the filler and stabilizer to be bound in or to the PVC particles.

The PVC, bio-based plasticizer and filler components are then mixed for up to 45 minutes, preferably less than 25 minutes with a minimum of 1 minute, to a drop temperature such that the bulk density of the dry blend is at least 0.67 g/cc, preferably at least 0.7 g/cc. The bulk density can be monitored during the mixing process to avoid under- and over-mixing of the dry blend composition and maximize the properties of the dry blend (e.g., extruder feed rate). The "drop temperature" is an upper temperature at which the dry blend composition is discharged or otherwise evacuated from the mixing equipment to a further processing apparatus such as an extruder, pelletizer, etc. The drop temperature is set at a temperature based on desired bulk density of the dry PVC blend with plasticizer incorporated in the PVC. In embodiments, the drop temperature is a range between 55 to 65° C., preferably 60° C.

The process of the invention increases bulk density of PVC dry blend compositions made with a bio-based plasticizer by aggregating the PVC particles and through adhesion of the filler particles on the surface of the PVC particles during the agglomeration process, which is preferably a uniform adhesion. In some embodiments, the process results in an increase in bulk density of the PVC dry blend composition by 20 to 40%, e.g., from a minimum of 0.60 gm/cc to a maximum of 0.85 gm/cc.

Figure 1B:
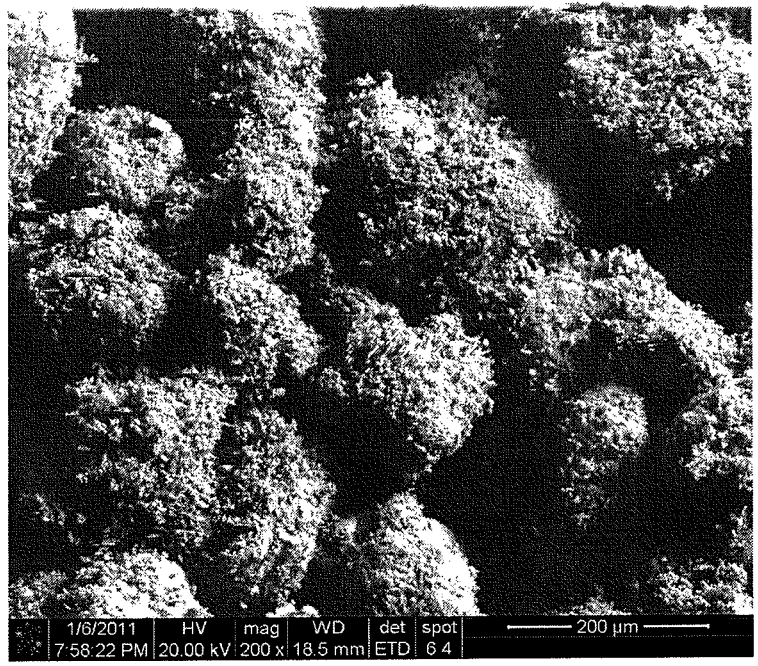

FIG. 1A is an SEM image (200 micron scale) of PVC particles of a dry blend composition made with DIPD phthalate plasticizer. By comparison, the dry blend composition resulting from the present process has a consistency that is dry to the touch under ambient conditions and an appearance as illustrated in FIG. 1B (SEM image at 200 micron scale) showing aggregated PVC particles of a dry blend composition made with LPLAS 1101 bio-based plasticizer with agglomerated particles of the filler adhered onto the surface of the PVC particles.

The surprising properties of the PVC dry blend compositions made according to the process of the invention enable subsequent processing at an increased output feed rate during the initial part of a melt compounding step due, at least in part, to the size and morphology of the PVC particle/filler aggregates and/or the bulk density of the dry blend composition, which leads to improved fluidization kinetics and higher process rates (e.g., through an extruder or compounding extruder).

Articles of Manufacture

The PVC dry blend composition can then be discharged into a holding bin for later use, or further compounded (via melt extrusion for example) and formed into an article (e.g., film, pellets, etc.). For example, the PVC dry blend composition can be further compounded with ingredient components using a mixing apparatus such as a Farrel continuous mixer and/or a single or twin screw extruder such as a Werner and Pfleiderer twin screw extruder or a Buss Kneader continuous single-screw extruder.

In particular embodiments, the PVC dry blend composition can be applied as a covering to a cable, e.g., a sheath, jacket or insulation layer, in known amounts and by known methods (e.g., with equipment and methods described in U.S. Pat. Nos. 5,246,783 and 4,144,202). Typically, the composition is prepared in a reactor-extruder equipped with a cable-coating die and after the components are formulated, the composition is extruded over the cable as the cable is drawn through the die. The sheath is then typically subjected to a cure period at temperatures from ambient up to but below the melting point of the composition until the article has reached the desired degree of crosslinking. Cure may begin in the reactor-extruder.

EXAMPLES

The following examples illustrate embodiments of methods for dry blending PVC compositions in accordance with the present invention. Unless otherwise noted, all parts and percentages are by weight.

Materials and Methods

The materials listed in Table 1 are used in the Comparative Examples and Inventive Examples.

TABLE 1

| Materials | Materials |
|---|---|
| Polyvinyl chloride (PVC) | Oxyvinyl 240F, melt temperature of 180-220° C. (OxyChem) |
| Diisodecyl phthalate (DIDP) | Phthalate plasticizer (Exxon Mobil) |
| ECOLIBRIUM LPLAS 1101 | Mixture of Soy-eFAME:ESO bio-based plasticizer (Dow Chemical Company) |
| CaCO₃ Hubercarb ® Q 1T | Filler, 1 micron average particle size, surface treated with fatty acid coatings (e.g., stearic acid) (Huber Engineered Materials) |
| Baeropan ® MC 9754 KA | Heat stabilizer (Baerlocher) |
| IRGANOX ® 1076 | Phenolic antioxidant (Ciba Specialty Chemicals) |

The following procedure is used to prepare PVC dry blend compositions.

Dry Blend Preparation

PVC (97-99 wt-%) and Baeropan® MC 9754 KA heat stabilizer (1-3 wt-%) are initially mixed together in a 20-liter plow blade blender (Gebr. Lödige Maschinenbau, Germany) at 100 rpm and heated to the stock temperature. The plasticizer is preheated to 60° C. and then pumped into the PVC stock mixture (over a pump time of 5.5 minutes). Mixing at the PVC stock temperature continues for the designated hold time and the CaCO₃ filler is then added. The mixture is compounded until the discharge (drop) temperature is reached. Bulk density is measured according to the procedure of ASTM D-792.

Melt Compounding

The dry blend PVC composition is then fed into a ¾-inch (19-mm) starve fed extruder (single screw, Brabender) to characterize the maximum extrusion rate at a fixed rotation per minute without flooding the feed hopper. The dry blend mixture is mixed at a 180° C. melt temperature (zone 1: 175° C., zone 2: 175° C., zone 3: 180° C., zone 4: 180° C.).

Plaque Preparation

Samples of the PVC dry blend mixtures are compression molded using a Greenard Hydrolair steam press (with quench cooling capability) operating in the manual mode. One 8×8 50 mil plaque for each sample is prepared. The press is preheated to 180° C. (±5° C.). A total of 50-85 grams of material is pre-weighed and placed in the center of a 50 mil stainless steel plaque between the mold assembly made up of mold release treated Mylar and aluminum sheets. The filled mold is then placed into the press and the pressure is increased to 2,200 psi and 180° C. for 5 minutes.

Example 1

Tables 2-3 list formulations of the Conventional and Comparative Examples, and Table 4 lists the Inventive Examples. Conventional Examples 1-2 (Table 2) are formulated with the DIDP phthalate plasticizer and processed according to conventional PVC/phthalate plasticizer processing conditions, bulk density and output rates, using conventional industry parameters of a PVC stock temperature at 90° C. at the time of adding the phthalate plasticizer and a discharge temperature of 85° C. Comparative Examples 1-9 (Table 3) are formulated with the ECOLIBRIUM LPLAS-1101 bio-based plasticizer using a PVC stock temperature and discharge (drop) temperature ranging from 55° C.-75° C. Inventive Examples 1-2 (Table 4) are formulated with the bio-based plasticizer and processed at a PVC stock temperature and discharge temperature of 60° C.

The results of the Conventional, Comparative and Inventive Examples are shown in Tables 2-4.

TABLE 2

Conventional Examples 1 and 2

| Component | Conv. Ex. 1 | Conv. Ex. 2 |
|---|---|---|
| PVC | 43.93 | 40.29 |
| CaCO$_3$ | 30.08 | 30.08 |
| DIDP | 24.36 | 28.0 |
| Baeropan 9754 KA | 1.33 | 1.33 |
| Irganox 1076 | 0.30 | 0.30 |
| TOTAL | 100.00 | 100.00 |
| PVC Stock Temp. (° C.) at plasticizer addition | 90.0 | 90.0 |
| DIDP Temp. (° C.) at addition | 60.0 | 60.0 |
| Hold time before filler addition (mins.) | 0.00 | 0.00 |
| Discharge temperature (° C.) | 90.00 | 90.00 |
| Bulk Density at discharge (gm/cc) | 0.70 | 0.72 |
| Extrusion Rate/min. (gm/min) | 63.30 | 76.20 |
| Head Pressure (psi) | 850.00 | 620.00 |
| Extruder Amps | 2.50 | 2.50 |

TABLE 4

Inventive Examples 1 and 2

| Component | Inventive Ex. 1 | Inventive Ex. 2 |
|---|---|---|
| PVC | 44.23 | 44.23 |
| CaCO3 (Q1T) | 30.08 | 30.08 |
| LPLAS-1101 Exp1 + 1.2 wt % Irganox 12076 | 24.36 | 24.36 |
| DIDP | 0.00 | 0.00 |
| Baeropan 9754 KA | 1.33 | 1.33 |
| Irganox 1076 | 0.00 | 0.00 |
| Total | 100.00 | 100.00 |
| PVC Stock Temp at Plasticizer Addition | 60.00 | 60.00 |
| Plasticizer Concentration | 24.00 | 24.00 |
| LPLAS Add Time | 330.00 | 330.00 |
| Plasticizer Addition Temp | 60.00 | 60.00 |
| Hold Time Before Filler Addition, min. | 1.00 | 2.00 |
| Discharge Temperature, C. | 60.00 | 60.00 |
| Bulk Density @ Discharge (gm/cc) | 0.76 | 0.73 |
| Extrusion Rate/min (gm/min) | 73.00 | 80.40 |
| Head Pressure (psi) | 1100.00 | 900.00 |
| Extruder Amps | 3.30 | 3.10 |

The results demonstrate that the extrusion output rates for the Inventive Examples 1-2 (73 and 80.4 gm/min) matched or surpassed the extrusion output rates (63.3 and 76.2 gm/min) of the Conventional Examples 1-2 made with the DIDP phthalate plasticizer. The bulk density and extrusion rate val-

TABLE 3

Comparative Examples 1-9

| Component | Comparative Ex. 1 | Comparative Ex. 2 | Comparative Ex. 3 | Comparative Ex. 4 | Comparative Ex. 5 | Comparative Ex. 6 | Comparative Ex. 7 | Comparative Ex. 8 | Comparative Ex. 9 |
|---|---|---|---|---|---|---|---|---|---|
| PVC | 45.59 | 50.59 | 45.59 | 40.59 | 50.59 | 45.59 | 40.59 | 50.59 | 40.59 |
| (CaCO3 (Q1T) | 30.08 | 30.08 | 30.08 | 30.08 | 30.08 | 30.08 | 30.08 | 30.08 | 30.08 |
| LPLAS-1101 Exp1 + 1.2 wt % Irganox 1076 | 23.00 | 18.00 | 23.00 | 28.00 | 18.00 | 23.00 | 28.00 | 18.00 | 28.00 |
| DIDP | 0.00 | 0.00 | 0.00 | 0.00 | 0.00 | 0.00 | 0.00 | 0.00 | 0.00 |
| Baeropan 9754 KA | 1.33 | 1.33 | 1.33 | 1.33 | 1.33 | 1.33 | 1.33 | 1.33 | 1.33 |
| Irganox 1076 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 |
| PVC Stock Temp at Plasticizer Addition | 65.00 | 75.00 | 65.00 | 75.00 | 55.00 | 65.00 | 75.00 | 75.00 | 65.0 |
| Plasticizer Concentration | 23.00 | 18.00 | 23.00 | 28.00 | 18.00 | 23.00 | 28.00 | 18.00 | 28.00 |
| LPLAS Add Time | 330.00 | 330.00 | 330.00 | 330.00 | 330.00 | 330.00 | 330.00 | 330.00 | 330.00 |
| Plasticizer Addition Temp | 60.00 | 60.00 | 60.00 | 60.00 | 60.00 | 60.00 | 60.00 | 60.00 | 60.00 |
| Hold Time Before Filler Addition, min | 0.00 | 0.00 | 0.00 | 0.00 | 0.00 | 0.00 | 0.00 | 0.00 | 0.00 |
| Discharge Temperature, C. | 65.00 | 75.00 | 65.00 | 75.00 | 55.00 | 65.00 | 75.00 | 75.00 | 65.00 |
| Bulk Density @ Discharge (gm/cc) | 0.61 | 0.59 | 0.62 | 0.65 | 0.63 | 0.65 | 0.66 | 0.60 | 0.66 |
| Extrusion Rate/min (gm/min) | 34.60 | 3.50 | 29.50 | 33.80 | 32.20 | 30.60 | 46.70 | 3.50 | 49.10 |
| Head Pressure (psi) | 700.00 | | 750.00 | 400.00 | 600.00 | 700.00 | 450.00 | | 480.00 |
| Extruder Amps | 2.30 | 2.00 | 2.30 | 2.00 | 2.00 | 2.10 | 2.00 | 2.00 | 2.00 | ues of the Inventive Examples 1-2 are similar to the dry blend of Conventional Examples 1-2 (Table 2) formulated with the DIDP plasticizer.

The results shown in Tables 3 and 4 demonstrate more than a 100% improvement in the extrusion output rate for the Inventive Examples 1-2 made according to the process of the invention at 73 and 80.4 gm/min compared to the Comparative Examples 1-9 at 3.5 to 49.1 gm/min.

Example 2

Fluidization Test

A fluidization test is conducted to determine the flowability of the powder blends for Comparative Examples 1-2 (Table 3) and the Inventive Examples 1-2 (Table 4). The test is conducted with nitrogen ($N_2$) gas flowing through a calibrated glass flow meter, through a glass distillation column (>50 ml) fitted with a glass distributor. Fifteen (15) grams of the PVC dry blend compositions are placed into the column and the $N_2$ gas is flowed through the glass distillation column. The minimum velocity at which the particles are fluidized is visually noted. This minimum fluidization velocity is reported as the fluidization velocity for the PVC dry blends.

The test results show a minimum fluidization velocity of 12.7 L/min for Inventive Examples 1-2 (Table 4) and 2.3 L/min for Comparative Examples 1-2 (Table 3). The results demonstrate that the Inventive Examples are less easily fluidized than the Comparative Examples, which is a significant factor in the extruder output feed rate. The bulk density of the Comparative Examples at 0.60 g/cc versus the Inventive Examples at 0.72 g/cc, correlate with the fluidization results.

Example 3

Hold Time

PVC dry blends shown in Table 5 below are prepared using various hold times of the mixing of the PVC stock with the plasticizer before adding the $CaCo_3$ filler.

TABLE 5

Effect of Hold Time

| Component | Inventive Ex. 1 | Inventive Ex. 2 | Inventive Ex. 3 | Comparative Ex. 1 |
|---|---|---|---|---|
| PVC | 44.23 | 44.23 | 44.23 | 44.23 |
| CaCO3 (Q1T) | 30.08 | 30.08 | 30.08 | 30.08 |
| LPLAS-1101 Exp1 + 1.2 wt % Irganox 1076 | 24.36 | 24.36 | 24.36 | 24.36 |
| Baeropan 9754 KA | 1.33 | 1.33 | 1.33 | 1.33 |
| Irganox 1076 | 0.00 | 0.00 | 0.00 | 0.00 |
| Total | 100.00 | 100.00 | 100.00 | 100.00 |
| PVC Stock Temp at Plasticizer Addition | 60.00 | 60.00 | 60.00 | 60.00 |
| Plasticizer Concentration | 24.00 | 24.00 | 24.00 | 24.00 |
| LPLAS Add Time | 330.00 | 330.00 | 330.00 | 330.00 |
| Plasticizer Addition Temp | 60.00 | 60.00 | 60.00 | 60.00 |
| Hold Time Before Filler Addition, min | 0.00 | 1.00 | 2.00 | 3.00 |
| Bulk Density @ Discharge (gm/cc) | 0.75 | 0.76 | 0.73 | 0.62 |
| Extrusion Rate/min (gm/min) | 75.20 | 73.00 | 80.40 | 63.50 |

The results in Table 5 show the effect of hold time on the bulk density (gm/cc) at discharge and the extrusion rate (gm/min). For the Inventive Examples 1-3, the hold time before adding the $CaCO_3$ filler is zero, 1 minute, and 2 minutes, respectively. For Comparative Example 1, the hold time is 3 minutes. The Comparative Example has a lower bulk density (0.62 gm/cc) and lower extrusion rate (63.5 gm/min) compared to the Inventive Examples.

Table 6 pertains to examples listed in Tables 3-4, and lists maximum hold times (in minutes) versus PVC stock temperature (° C.).

TABLE 6

Hold Time at a PVC Stock Temperature

| PVC Stock Temp. | Hold Time Range, minutes | |
| ° C. | (minimum) | (maximum) |
|---|---|---|
| 25 | 0 | ≥60 |
| 40 | 0 | 35 |
| 45 | 0 | 25 |
| 50 | 0 | 15 |
| 55 | 0 | 10 |
| 60 | 0 | 3 |
| 65 | 0 | 1.5 |
| 70 | 0 | 1 |
| 80 | 0 | 0.5 |

By corresponding the hold time with the PVC stock temperature, particle agglomeration and bulk density characteristics of the PVC dry blend can be controlled. The ranges for the stock temperature, hold times and drop temperatures will change according to the components (e.g., type of plasticizer), the ratio of components and/or the amount of plasticizer. As an example, if the average molecular weight of the plasticizer or plasticizer blend is decreased, hold time, stock temperature and drop temperature can be reduced accordingly to achieve a high density and well agglomerated dry blend that will provide a high output feed rate. In another example, with a reduction in the amount of the bio-based plasticizer, there is less plasticizer available for agglomeration of the PVC particles, whereby the hold time and drop temperature can be reduced. As another example, in the use of a low molecular weight bio-based plasticizer (e.g., soy eFAME), a fast diffusion into the PVC particles can occur, thus reducing the hold time at a given temperature. By comparison, if a high molecular weight bio-based plasticizer (e.g., ESO) is used, a slower rate of diffusion into the PVC particles can occur requiring a higher hold time at the same given temperature.

Example 4

PVC Stock Temperature

PVC dry blends are prepared as listed in Table 7 below. Comparative Example 1 made with a phthalate plasticizer (DIDP) is prepared using a PVC Stock Temperature of 90° C. according to typical industry process conditions. Comparative Examples 2-3 and Inventive Example 1 (prepared with LPLAS-1101) are prepared using different PVC stock temperatures at 90° C., 80° C. and 60° C., respectively.

TABLE 7

Effect of PVC Stock Temperature

| Component | Comparative Ex. 1 | Comparative Ex. 2 | Comparative Ex. 3 | Inventive Ex. 1 |
|---|---|---|---|---|
| PVC | 40.29 | 44.29 | 44.29 | 44.23 |
| CaCO3 (Q1T) | 30.08 | 30.08 | 30.08 | 30.08 |
| LPLAS-1101 Exp1 + 1.2 wt % Irganox 1076 | 0.00 | 24.00 | 24.00 | 24.36 |
| DIDP | 28.00 | 0.00 | 0.00 | 0.0 |
| Baeropan 9754 KA | 1.33 | 1.33 | 1.33 | 1.33 |
| Irganox 1076 | 0.30 | 0.30 | 0.30 | 0.00 |
| Total | 100.00 | 100.00 | 100.00 | 100.00 |
| PVC Stock Temp at Plasticizer Addition | 90.00 | 90.00 | 80.00 | 60.00 |
| Plasticizer Concentration | 28.00 | 24.00 | 24.00 | 24.00 |
| LPLAS Add Time | 330.00 | 330.00 | 330.00 | 330.00 |
| Plasticizer Addition Temp | 60.00 | 60.00 | 60.00 | 60.00 |
| Hold Time Before Filler Addition, min | 0.00 | 0.00 | 0.00 | 0.00 |
| Bulk Density @ Discharge (gm/cc) | 0.72 | 0.66 | 0.63 | 0.75 |
| Extrusion Rate/min (gm/min) | 76.20 | 62.45 | 62.45 | 75.20 |

The results show that the Inventive Example 1 has a bulk density at discharge (0.75 gm/cc) and an extrusion rate (75.2 gm/min) similar to the bulk density (0.72 gm/cc) and extrusion rate (76.20 gm/min) of Comparative Example 1 made with the DIDP plasticizer using a higher stock temperature (90° C. vs. 60° C.). Inventive Example 1 also has a greater bulk density and higher extrusion rate than Comparative Examples 2-3 produced using a higher PVC stock temperature (80° C., 90° C.).

Example 5

Agglomeration Size Versus Bulk Density

PVC dry blends are prepared as listed in Table 8 below and the agglomeration size of the PVC particles is measured.

TABLE 8

PVC Dry Blends

| Component | Conventional Ex. 1 (Table 2) | Inventive Ex. 1 (Table 4) | Comparative Ex. 1 (Table 3) |
|---|---|---|---|
| PVC | 43.93 | 44.23 | 45.59 |
| CaCO3 | 30.08 | 30.08 | 30.08 |
| DIDP | 24.36 | 0 | 0 |
| ECOLIBRIUM LPLAS-1101 | 0 | 24.36 | 23.00 |
| Baeropan 9754 KA | 1.33 | 1.33 | 1.33 |
| Irganox 1076 | 0.30 | 0.00 | 0.00 |
| TOTAL | 100.00 | 100 | 100.00 |
| PVC Stock Temp. (° C.) at plasticizer addition | 90 | 60 | 65 |
| DIDP or LPLAS 1101 Temp. (° C.) at addition | 60 | 60 | 60 |
| Hold time before filler addition (mins.) | 0 | 1 | 0 |
| Discharge temperature (° C.) | 90 | 60 | 65 |
| Bulk Density (gm/cc) | >0.67 | >0.67 | <0.67 |
| Dry blend agglomerate particle size (mm), maximum average agglomerate size | 8-10 | 5-10 | 0.5 |

The PVC dry blend of Inventive Example 1 (Table 4) (PVC/LPLAS 1101 dry blend) had a similar appearance, particle size distribution, bulk density and fluidization characteristics as the Conventional Example 1 (Table 2) (PVC/DIDP dry blend). The characteristics of the PVC dry blend of Comparative Example 1 (Table 3) (PVC/LPLAS 1101 dry blend) were not similar to the Conventional Example 1 (Table 2) (PVC/DIDP dry blend).

The minimum average agglomerate of a single PVC particle size for each of the Examples is about 200 µm. Other non-PVC clusters or particles (i.e., fillers) ranging from 1 to 200 µm can also be present in the system.

Figure 2:
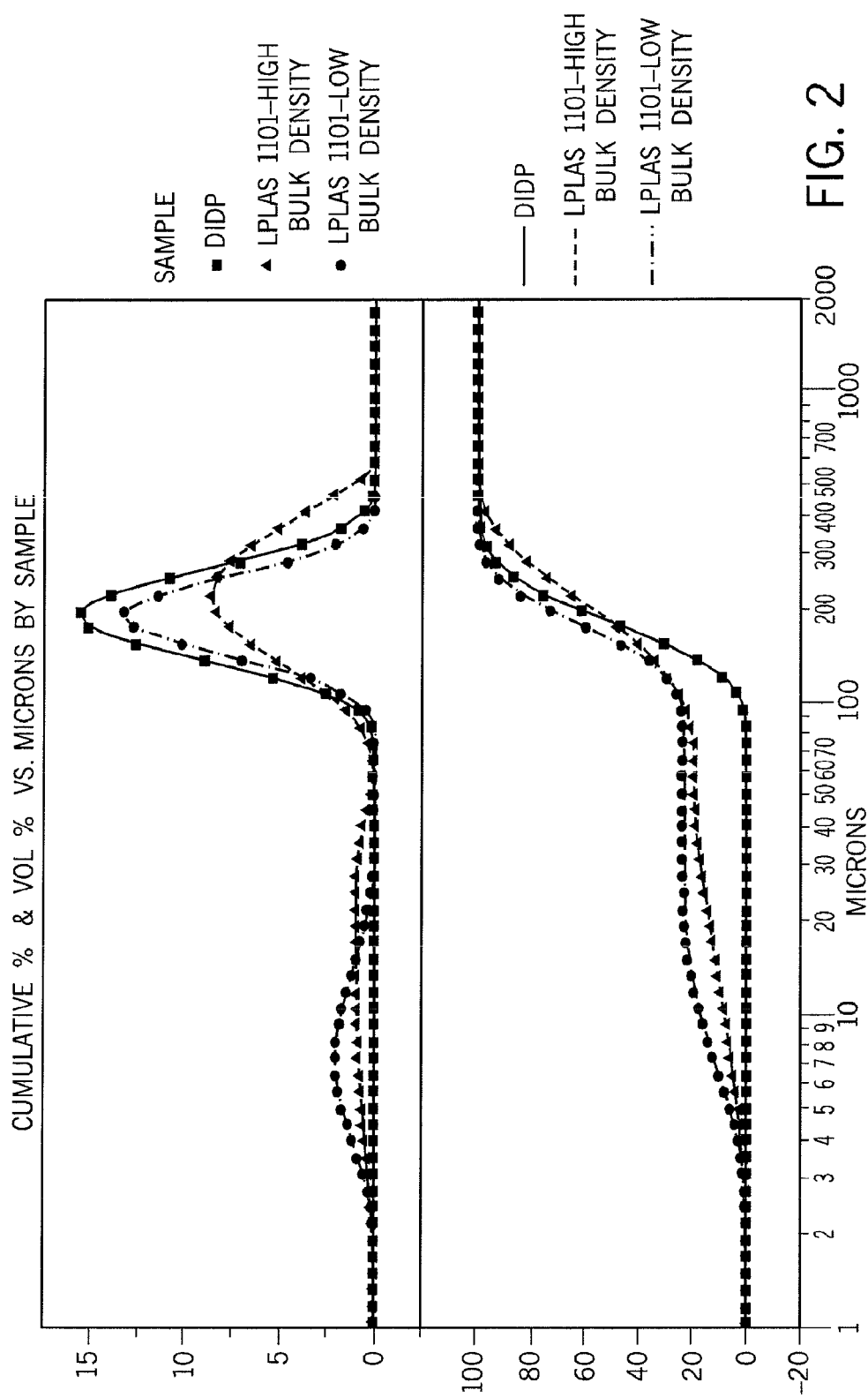
FIG. 2 is a plot of the data from Example 5, showing cumulative % and volume % versus microns (μm) of the PVC aggregate particles measured by Malvern sieve analysis.

The minimum agglomerate size of the PVC particles is measured by Scanning Electron Microscope (SEM) and confirmed by measurements using a Malvern sieve analysis. Malvern-Sieving is a conventional technique for particle size analysis, providing mass distributions over a wide range of sizes. In sum, the technique segregates a sample according to the size of the particles by passing the particles through a series of fine mesh sieves stacked one on top of the other. The particle size distribution is then calculated by measuring the mass of particles retained on each sieve. In doing this, it is assumed that, by shaking the sieve stack, particles are able to fall through the sieve stack until they are correctly distributed. This requires the stack to be shaken for significant length of time. This technique represents a useful method of separating particles based on their size. In brief, Malvern sieve analysis segregates a sample according to the size of the particles by passing them through a series of fine mesh sieves stacked one on top of the other. The particle size distribution is then calculated by measuring the mass of particles retained on each sieve. The results are shown in FIG. 2, which depicts cumulative % and volume % versus microns (µm).

The maximum average PVC particle size (µm) is reported based on the direct measurement of the large-sized particles against a ruler. Since the Malvern sieve process tends to break up the larger particles, PVC agglomerates above 500 µm are not measured in this test.

Example 6

PVC dry blends are prepared as listed in Table 9 below using different PVC stock temperatures (and no holding time before filler addition).

TABLE 9

PVC Stock Temperature/No Hold Time

| Component | Comparative Ex. 1 | Comparative Ex. 2 | Comparative Ex. 3 | Comparative Ex. 4 | Comparative Ex. 5 | Inventive Ex. 1 |
|---|---|---|---|---|---|---|
| PVC | 40.29 | 40.29 | 40.29 | 44.29 | 44.29 | 44.23 |
| CaCO3 (Q1T) | 30.08 | 30.08 | 30.08 | 30.08 | 30.08 | 30.08 |

TABLE 9-continued

PVC Stock Temperature/No Hold Time

| Component | Comparative Ex. 1 | Comparative Ex. 2 | Comparative Ex. 3 | Comparative Ex. 4 | Comparative Ex. 5 | Inventive Ex. 1 |
|---|---|---|---|---|---|---|
| LPLAS-1101 Exp1 + 1.2 wt % Irganox 1076 | 0.00 | 0.00 | 0.00 | 24.00 | 24.00 | 24.36 |
| DIDP | 28.00 | 28.00 | 28.00 | 0.00 | 0.00 | 0.00 |
| Baeropan 9754 KS | 1.33 | 1.33 | 1.33 | 1.33 | 1.33 | 1.33 |
| Irganox 1076 | 0.30 | 0.30 | 0.30 | 0.30 | 0.30 | 0.00 |
| Total | 100.00 | 100.00 | 100.00 | 100.00 | 100.00 | 100.00 |
| PVC Stock Temp at Plasticizer Addition | 90.00 | 80.00 | 60.00 | 90.00 | 80.00 | 60.00 |
| Plasticizer Concentration | 28.00 | 28.00 | 28.00 | 24.00 | 24.00 | 24.00 |
| LPLAS Add Time | 330.00 | 330.00 | 330.00 | 330.00 | 330.00 | 330.00 |
| Plasticizer Addition Temp | 60.00 | 60.00 | 60.00 | 60.00 | 60.00 | 60.00 |
| Hold Time Before Filler Addition, Min | 0.00 | 0.00 | 0.00 | 0.00 | 0.00 | 0.00 |
| Bulk Density @ Discharge (gm/cc) | 0.72 | NA (wet Cement) | NA (wet Cement) | 0.66 | 0.63 | 0.75 |
| Extrusion Rate/min (gm/min) | 78.20 | 0.00 | 0.00 | 62.45 | 62.45 | 75.20 |

Comparative Examples 1-2 are prepared using typical industrial process conditions, i.e., 90° C. and 80° C. PVC stock temperature at a given plasticizer loading, 5-10 minutes of plasticizer addition time, and a filler loading of 30 wt %. Comparative Example 3 has the same formulation but the consistency of wet cement when prepared by the process of the invention using a 60° C. PVC stock temperature, which demonstrates that a PVC-DIDP dry blend cannot be produced by the process of the invention using the lower stock temperature.

Similarly, Comparative Examples 4-5 prepared using typical industrial process conditions (PVC stock temperature of 80° C. and 90° C.) produced blends having a lower bulk density and extrusion rate compared to Inventive Example 1 having the same PVC/LPLAS formulation but prepared according to the process of the invention (60° C. PVC stock temperature).

Inventive Example 1 (PVC/LPLAS blend) prepared according to the process of the invention (using a PVC stock temperature of 60° C.) has a comparable dry blend bulk density (0.75 gm/cc) and extrusion rate (75.2 gm/min) as Comparative Example 1 (PVC/DIDP dry blend prepared using typical industrial process conditions (PVC stock temperature of 90° C.)).

Example 7

Alterations to Process Conditions

Table 10 below provides process conditions for a range of stock temperatures, hold times and drop temperatures, for producing a PVC dry blend with ECOLIBRIUM LPLAS-1101, a bio-based plasticizer composed of a 50:50 (w/w) blend of ESO and soy eFAME at a loading of 24 wt % according to the process of the invention.

TABLE 10

| Stock Temperature, ° C. | Hold Time Range, min | | Drop Temperature, ° C. | | Density, g/cc |
|---|---|---|---|---|---|
| | Min | Max | Min | Max | |
| 25 | 0.1 | ≥60 | ≥25 | 70 | >0.67 |
| 40 | 0.1 | 35 | ≥25 | 70 | |
| 45 | 0.1 | 25 | ≥25 | 70 | |
| 50 | 0.1 | 15 | ≥25 | 70 | |
| 55 | 0.1 | 10 | ≥25 | 70 | |
| 60 | 0.1 | 3 | ≥25 | 70 | |
| 65 | 0.1 | 1.5 | ≥25 | 70 | |
| 70 | 0.1 | 1 | ≥25 | 70 | |
| 80 | 0.1 | 0.5 | ≥25 | 70 | |

The invention claimed is:

1. A process for producing a polyvinyl chloride (PVC) dry blend composition, the process comprising mixing (a) PVC, (b) a phthalate-free bio-based plasticizer comprising a blend of (i) an epoxidized fatty acid ester, and (ii) an epoxidized fatty acid $C_1$-$C_{14}$ ester, and (c) a filler, at a temperature between 25° C. and 70° C. and a time effective to form a dry mixture comprising aggregated PVC particles and having a bulk density of greater than 0.67 g/cc.

2. The process of claim 1 in which the bio-based plasticizer comprises a blend of (i) epoxidized soil bean oil (ESO), and (ii) epoxidized methyl ester of soybean oil (soy-eFAME).

3. The process of claim 2 in which the bio-based plasticizer comprises a 75:25 to 25:75 (w/w) blend of ESO and soy-eFAME.

4. A process for producing a polyvinyl chloride (PVC) dry blend composition free of a phthalate-based plasticizer, the process comprising mixing (A) PVC, (B) a phthalate-free bio-based plasticizer comprising a blend of (1) an epoxidized fatty acid ester, and (2) an epoxidized fatty acid $C_1$-$C_{14}$ ester, and (C) a filler at a temperature between 25° C. and 70° C. and a time effective to form a dry mixture comprising aggregated PVC particles and having a bulk density of greater than 0.67 g/cc.

5. The process of claim 4 wherein the bio-based plasticizer comprises a blend of epoxidized soybean oil (ESO) and epoxidized methyl ester of soybean oil (soy-eFAME).

6. The process of claim 5 wherein the bio-based plasticizer comprises a 75:25 to 25:75 (w/w) blend of ESO and soy-eFAME.

7. The process of claim 5 wherein said mixing comprises first mixing the PVC with the bio-based plasticizer for a hold time and then mixing the filler with the PVC/plasticizer mixture to form the dry mixture.

8. The process of claim 7 wherein said mixing of the PVC, the bio-based plasticizer and the filler is conducted until said bulk density and a drop temperature of 55° C. to 65° C. are reached.

9. The process of claim 4 wherein the PVC dry blend composition comprises:
A. 20 to 80 wt % PVC;
B. 10 to 40 wt % bio-based plasticizer; and
C. 5 to 40 wt % filler.

10. The process of claim 4 wherein the PVC dry blend composition has an extrusion rate of greater than 65 gm/minute for a single screw extruder of 0.75-inch (19 mm) barrel diameter with a 25:1 L:D general purpose polyethylene screw at 75 rotations per minute screw speed.

11. The process of claim 4 wherein the aggregated PVC particles have an average particle size of 0.1 to 10 mm.

12. The process of claim 4 wherein particles of the filler are agglomerated on the aggregated PVC particles.

* * * * *